United States Patent [19]

Kasper et al.

[11] Patent Number: 4,948,092
[45] Date of Patent: Aug. 14, 1990

[54] COMBINED CHECK VALVE AND FLUID PRESSURE RELIEF VALVE

[75] Inventors: Thomas A. Kasper, Agoura Hills; William G. Lucas, Los Angeles; Gus A. Singas, Newbury Park, all of Calif.

[73] Assignee: Royce Medical Company, Westlake Village, Calif.

[21] Appl. No.: 489,965

[22] Filed: Mar. 7, 1990

[51] Int. Cl.⁵ .................... F16K 15/18; F16K 15/20
[52] U.S. Cl. .................................. 251/82; 137/223; 137/226; 137/523; 137/846; 251/100; 251/339
[58] Field of Search ............... 137/223, 226, 231, 522, 137/523, 846, 847, 849, 850; 251/82, 83, 100, 252, 320, 321, 322, 323, 339

[56] References Cited

U.S. PATENT DOCUMENTS

| | | |
|---|---|---|
| 1,182,375 | 5/1916 | Hutson ........................ 251/100 |
| 2,069,105 | 1/1937 | Engle ........................... 137/223 |
| 3,312,213 | 4/1967 | Timm ........................... 137/226 |
| 3,351,081 | 11/1967 | Bogossian et al. ......... 137/541 |
| 3,536,117 | 10/1970 | Huber .......................... 137/223 |
| 3,901,272 | 8/1975 | Banners et al. ............. 137/846 |
| 4,060,184 | 11/1977 | O'Neil, Sr. ................... 251/339 |
| 4,062,377 | 12/1977 | Ward ............................ 137/523 |
| 4,176,681 | 12/1979 | Mackal ........................ 137/541 |
| 4,535,818 | 8/1985 | Duncan et al. ............. 137/846 |
| 4,549,573 | 10/1985 | Breckenridge ............. 251/83 |

FOREIGN PATENT DOCUMENTS

| | | | |
|---|---|---|---|
| 676719 | 2/1930 | France ....................... | 137/223 |
| 22007 | 11/1894 | United Kingdom ...... | 137/223 |

Primary Examiner—George L. Walton
Attorney, Agent, or Firm—Poms, Smith, Lande & Rose

[57] ABSTRACT

A combined check valve and relief valve assembly for permitting the free of a fluid in a first direction and for selectively preventing backflow. Backflow occurs only upon depression of a compression spring-loaded cylindrical valve actuator housed within the valve body. The valve assembly comprises a valve body having an inlet and outlet port which are adjacent to an upper and lower cylindrical bore respectively, thus providing a flow path. A resilient duckbill valve is mounted within the cylindrical bores. A compression spring-loaded valve actuator is also received, lossely, within the valve body and is provided with a stem at the end of the valve actuator, proximate to the opening of the duckbill valve. Fluid passing through the upper cylindrical core around the valve actuator opens the lips of the duckbill valve permitting free passage therethrough. Back pressure seals the lips of the duckbill valve so that the valve becomes a check valve. Depression of the valve actuator, however, causes the stem thereof to penetrate and open the valve lips to selectively permit backflow to provide the relief valve function.

20 Claims, 2 Drawing Sheets

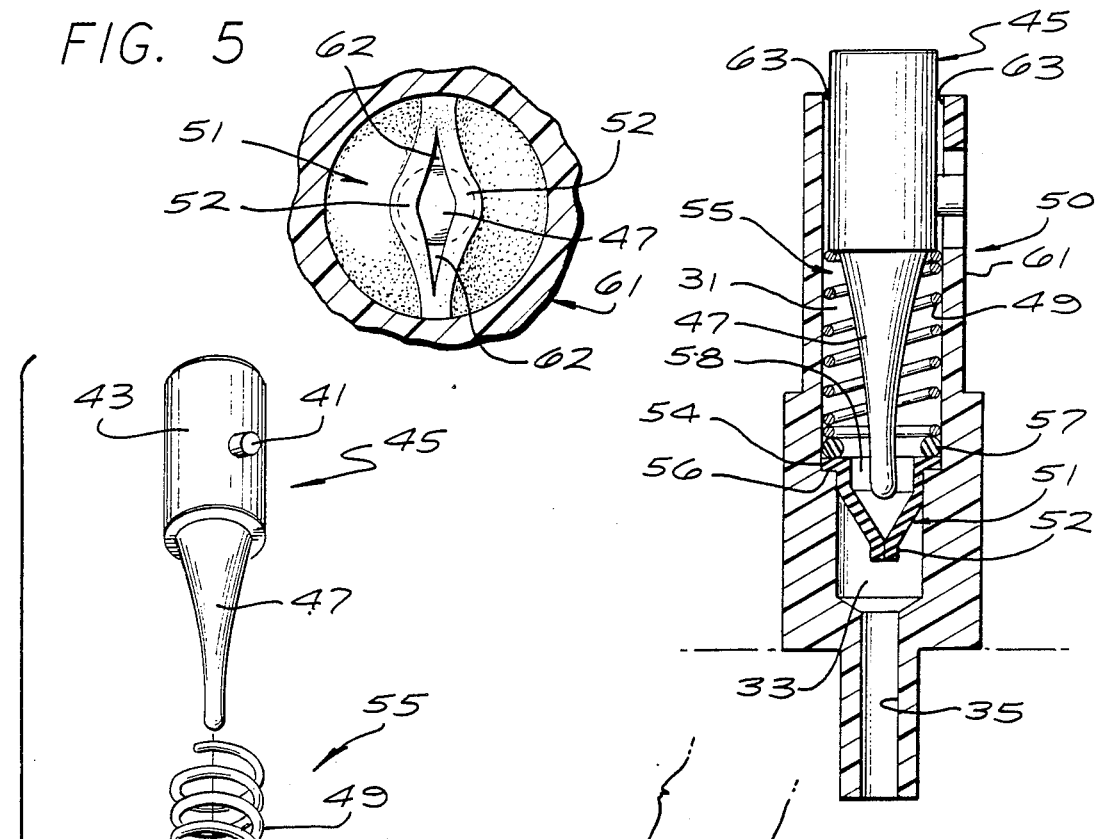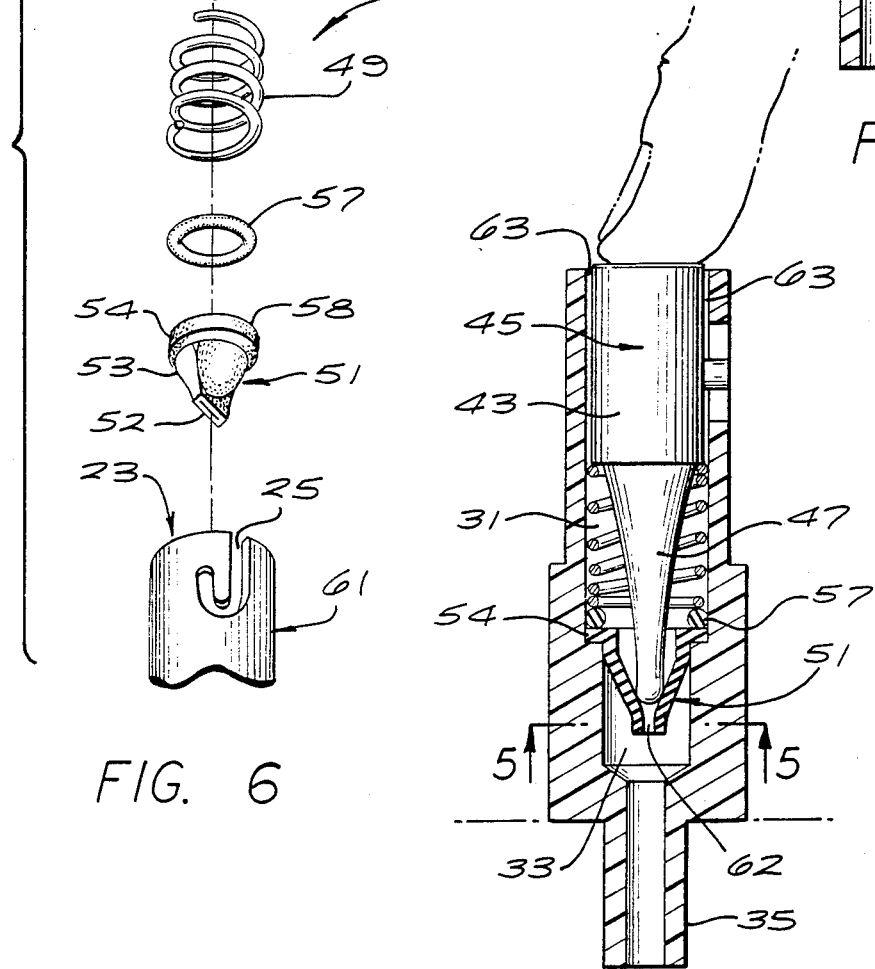

COMBINED CHECK VALVE AND FLUID PRESSURE RELIEF VALVE

FIELD OF THE INVENTION

The present invention relates in general to a valve apparatus and more particularly to a novel combination duckbill-type check valve and fluid pressure relief valve.

BACKGROUND OF THE INVENTION

One way check valves, duckbill valves and other types of flow regulation apparatuses have been known in the art for a variety of applications. For example, U.S. Pat. Nos. 3,901,272, 4,535,818 and 4,060,184 show duckbill check valves. Duckbill valves typically include a housing into which a resilient flow regulator is mounted. These valves usually consist of a slitted opening or lips which are arranged in a converging relationship from an open end to a normally closed, slitted end. The slitted opening is normally closed by a higher fluid pressure level existing outside of the duckbill-like portion than inside. When, however, the fluid pressure is greater internally, rather than externally, the closed slitted position will then open, thus permitting the free passage of a fluid such as air to the normally closed side of the duckbill valve.

The duckbill check valves disclosed U.S. Pat. Nos. 3,901,272 and 4,060,184 are opened by penetrating and opening the lips via the open-ended portion of the duckbill valve by a tapered rod and wire member, respectively.

U.S. Pat. Nos. 3,351,081 and 4,176,681 disclose air inflation valves opened against the force of a compression spring by inflating air pressure. These valves are held closed by back pressure and thus operate as check valves. Deflation may be accomplished by depressing an actuator to open the valves.

Although the aforementioned valves generally operate satisfactorily, these valves do not, in fact, provide a combined duckbill check valve and pressure relief valve apparatus. Furthermore, these valves are not equipped with a tamper-proof, push-button mechanism whereby the user may release the pressure of a fluid easily by depressing, with his or her finger, a valve actuator to permit a controlled amount of backflow of a given fluid or deflation of an inflated member, for example.

SUMMARY OF THE INVENTION

To overcome the aforementioned problems, the present invention provides a valve assembly that will provide a controlled linear flow of a fluid in one direction and prevent flow in the opposite direction with a minimum of moveable parts. This valve, upon depression of a compression spring-loaded valve actuator, may controllably permit the free flow in the opposite direction, thus relieving pressure.

A valve assembly illustrating the principles of the invention includes a resilient duckbill-type check valve received within a cylindrical portion of a valve body or housing. A compression spring-loaded cylindrical push-button actuated relief valve portion of the valve assembly is also received (loosely) within the cylindrical portion of the valve body or housing and is provided with a stem of reduced diameter at the end of the actuator, proximate to the duckbill valve. A fluid such as air may then pass from the inlet port of the valve through the cylindrical portion of the valve body around the actuator and open the lips of the valve permitting free passage of a fluid from one end of the valve body to the other. Back pressure seals the lips of the valve so that the valve may act as a check valve. Moreover, to permit backflow, the user simply presses the push-button actuator, causing the reduced diameter stem portion of the actuator to penetrate and open the valve lips, thus enabling backflow.

An inflation pump may also be provided with an outlet which fits over the valve body and the aligned, push-button actuator, for ease in inflation. Several valve bodies may be mounted side-by-side spaced slightly apart, so that the pump may be selectively applied to the desired valve, and any of the three push-button actuators may be used for selective inflation and deflation of desired pressurized volumes.

Accordingly, it is an object of the present invention to provide a novel combined check valve and fluid pressure relief valve apparatus which will provide a controlled fluid flow in one direction without any backflow, and upon depression of an actuator, controlled fluid flow in the opposite direction.

Another object is to provide a valve that is easy to assemble, easy to repair and inexpensive to manufacture since the valve components are easy to disassemble and the valve body and its components may be fabricated from inexpensive materials, e.g. plastic.

Still another object is to provide a valve which includes a substantially tamper-proof mechanism which will prevent others from interfering with the use and/or easily disassembling the valve apparatus.

Other objects, features and advantages of the invention will become apparent from a consideration of the following detailed description and from the accompanying drawings.

BRIEF DESCRIPTION OF THE DRAWINGS

FIG. 3 is a cross-sectional view of the valve apparatus taken along line 3—3 of FIG. 2, showing the valve in an assembled state in which the valve pressure release actuator is in the inactive position;

FIG. 4 is a cross-sectional view of the valve apparatus, showing the valve in an assembled state in which the push-button pressure release valve actuator is depressed;

FIG. 5 is a cross-sectional view taken along line 5—5 of FIG. 4, viewed from the bottom outlet port of the valve apparatus; and FIG. 6 is an exploded view of the valve apparatus showing certain key internal components of the valve assembly.

DETAILED DESCRIPTION OF THE PREFERRED EMBODIMENT

Figure 1:
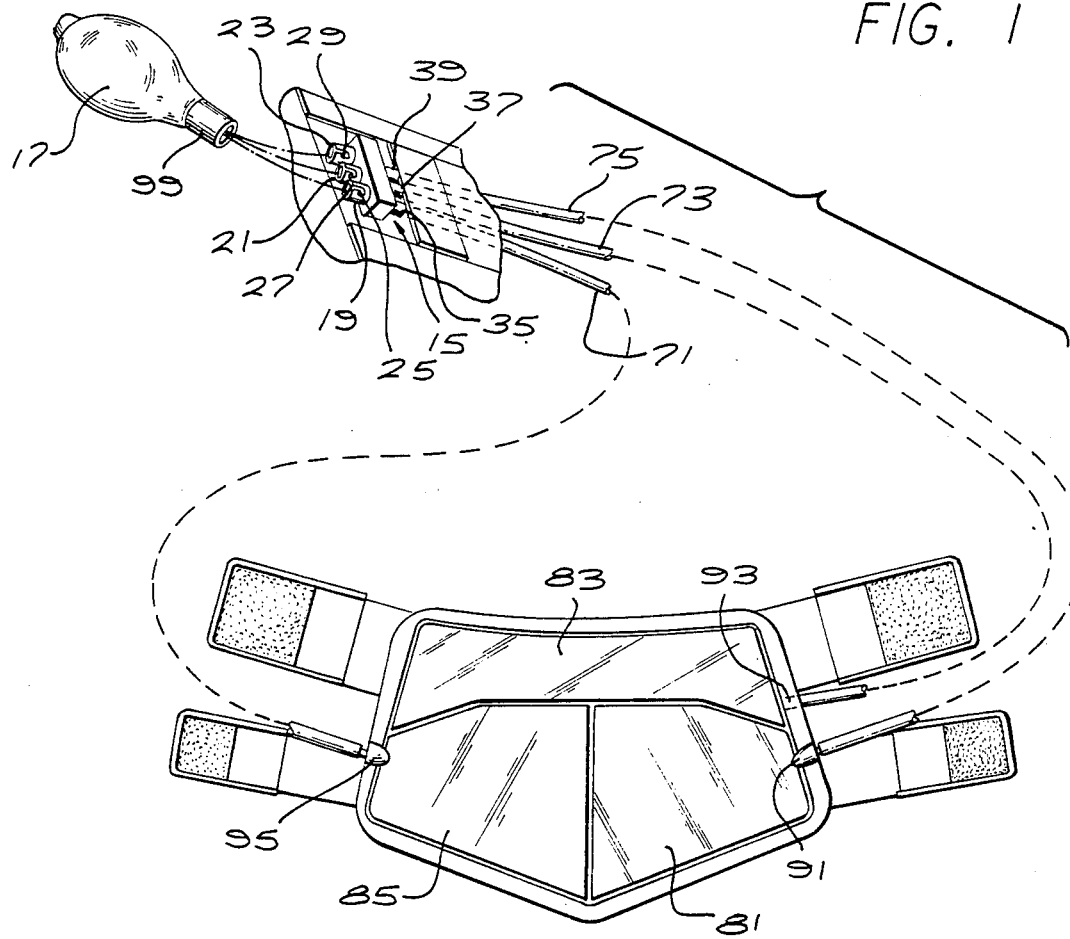
FIG. 1 is a perspective view of a combined check valve and fluid pressure relief valve illustrating the principles of the current invention as used with inflatable air bladders and an inflation bulb or pump.

Referring more particularly to the drawings, FIG. 1 shows a valve apparatus 15 in accordance with one embodiment of the present invention as it is used to inflate a series of inflatable air bladders 81, 83, 85. In particular, the valve apparatus 15, which is preferably constructed of molded, rigid plastic material, is an embodiment of a three-valve unit wherein an inflation bulb 17 or other source of fluid pressure is secured over any one of three inlet ports 19, 21, 23. Furthermore, the outlet 99 from the bulb 17 must completely envelop and seal off any of the "J"-shaped grooves 25, 27, 29 in order to properly supply fluid such as air through the first and second cylindrical bores 31, 33, respectively (see FIG. 2). The valve apparatus 15 also includes three outlet ports 35, 37, 39. Each of these outlet ports 35, 37, 39 are connected to and securely sealed to tubes 71, 73, 75 which are constructed of a resilient type of material, for example, plastic or rubber. The opposite ends of the tubes 71, 73, 75 are then securely coupled to three individual bladder ports 95, 93, 91, allowing for the fluid such as air to inflate each bladder 85, 83, 81, respectively. The bladders may, for example form part of a back support, as disclosed for example in U.S. patent application Ser. No. 07/308,687, filed Feb. 8, 1989, and assigned to the assignee of this invention.

Figure 2:
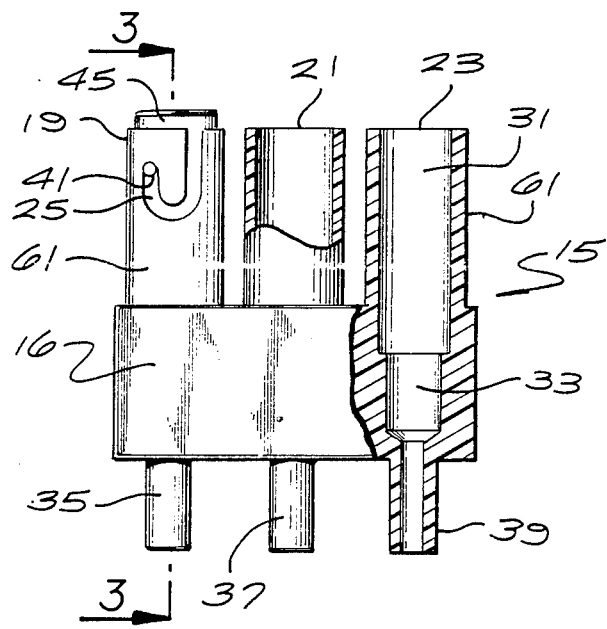
FIG. 2 is a partial cross-sectional view of the valve body of a three-valve unit illustrating the invention.

FIG. 2 is a partial cross-sectional view of a three-valve apparatus 15 showing the cylindrical portions of the three-valve bodies 61. The valve bodies 61 are adjacent to each other and are secured to a common body member 16. Each individual valve body 61 includes a "J"-shaped groove 25. The "J"-shaped groove 25 provides a path wherein a guide and retention knob member 41, located on the untapered portion 43 of a compression spring-loaded relief valve actuator 45 (see FIG. 6), may be received. The knob member 41 is located a substantial distance from the top of the untapered portion 43 and is positioned on the outer surface of the untapered portion of the push-button actuator 45. The knob member 41 has a diameter less than the width of the "J"-shaped groove and extends perpendicularly outward from the actuator 45 a substantial distance so that it is substantially flush with the outer surface of the valve body 61.

The knob member 41 provides a means for assembling and securing the push-button pressure release valve actuator 45 within the valve body 61. By aligning the knob member 41 with open end of the "J"-shaped groove 15, the valve actuator 45 is then inserted into the valve body 61 and is secured therein when the knob member 41 rests adjacent the closed end of the "J"-shaped groove 25. At this position the valve actuator 45 becomes substantially tamper-proof.

FIG. 2 also includes a sectional view of one of the valve bodies 61. The interior of the valve body essentially consists of a first and a second cylindrical bore 31, 33 respectively, with bore 33 being coupled to the smaller diameter outlet port 39. The first bore 31 extends a distance from the inlet port opening 23 to the beginning of the second bore 33. The cross-sectional area of the first bore 31 is greater than the cross-sectional area of the second bore 33. The second bore 33 extends a distance from the bottom of the first bore 31 to the outlet port 39, thus allowing the linear passage of fluid, such as air, through the valve body 61.

FIG. 3 shows an illustrative embodiment of the invention and is generally designed by reference character 50. The valve 50, generally, has a cylindrical body 61. The interior of the body 61 consists of a first cylindrical bore 31 which extends to a second cylindrical bore 33, as noted above. Mounted within the valve body 61 is a valve sub-assembly 55, the parts of which may be seen more clearly in the exploded view of FIG. 6.

A duckbill type check valve 51 is received within the valve body 61 with a pair of lips 52 of the valve 51 facing downward. A flanged base 54 of the duckbill valve 51 is compressively engaged against the shoulder 56 of the valve body between bores 31 and 33. The duckbill valve member 51 is molded as a single piece of resilient material in a generally cylindrical hollow-shape. The lips 52 form a portion of the valve 51 and are disposed in a converging relationship 50 that the lips 52 are adjacent to each other at one end of the valve 51, as shown in FIG. 6.

The duckbill type check valve 51 is a commercially available rubber part. Side walls 53 interconnect the lips 52 and base 54 to define an open end 58 for the valve 51. The outwardly extending flange 54 is located around the open end 58. The flange is larger in diameter than the diameter of the second bore 33, yet it is no greater in diameter than the diameter of the first bore 31.

Furthermore, the length of the duckbill valve 51 extends only so far as to allow for clearance between the second bore 33 and the outlet port 35.

A resilient annular sealing washer or gasket, for example, an O-ring washer 57 having a diameter about equal to the diameter of the flange 54 of the duckbill valve 51 is then received into the valve body. The washer 57 rests squarely on the flange 54 of the duckbill valve 51.

A compression spring-loaded cylindrical push-button relief valve actuator 45, preferably made of a rigid plastic material, is loosely received into the valve body. The actuator 45 axially tapers downward forming a narrow stem 47 having a diameter sufficient to penetrate the lips 52 and permit fluid such as air to flow through openings 62 created in the duckbill valve 51. The stem 47 is proximate to the duckbill valve 51. In addition, the actuator 45 may only be received if the knob member 41, is aligned with the "J"-shaped groove 25, as shown more clearly in FIGS. 2 and 7. The actuator 45 is secured and becomes substantially tamper-proof when the knob member 41 rests against the closed end of the "J"-shaped groove 25. The actuator 45, protrudes a substantial distance from the upper plane of the valve body 61, thus allowing the user a push-button mechanism for relieving pressure through the valve. The washer 57 provides additional support between the flanged portion 54 of the duckbill valve 51 and a compression coil spring member 49 of the actuator 45.

FIG. 3 shows the valve 50, in the present invention, in a position whereby fluid such as air may enter the valve 50 from the inlet port 19 through the peripheral space 63 which exists between the walls of the first bore 31 and the loosely fitted actuator 45. The fluid then opens the lips 52 of duckbill valve, and passes through the outlet port 35 via the second bore 33. When the pressure of the fluid subsides, the lips 52 close, thus acting as a check valve by preventing backflow of the fluid.

FIG. 4 illustrates the manner in which the valve 50 may allow backflow of a fluid to adjust pressure levels. To allow for backflow of a fluid, it must first be understood that the pressure at the outlet port 35 must be greater than the pressure existing outside the inlet port 19, for example, when a bladder attached to outlet port 35 is inflated. When the valve actuator 45 is depressed, its stem 47 penetrates the lips 52 of the duckbill valve 51, as also shown in FIG. 5. The lips 52 then open up and the fluid such as air passes through the outlet port 39, through the openings 62 created between the lips, through the first bore 31, then through the peripheral space 63 and out the "J"-shaped groove 25 and inlet port 19. Thus, the valve acts as a fluid pressure relief valve.

Upon releasing the actuator 45, the compression coil spring member 49 forces the actuator 45 and its stem 47 upward and away from the lips 52 of the duckbill valve 51, thus permitting the lips to seal together and preventing additional backflow. As mentioned above, the outlet 99 from the pump 17 extends over the push-button actuator 45, and the "J"-shaped slots 25, making a tight fit over the cylindrical housings 61 so that pumping action of the pump or inflation bulb 17 serves to force air or other fluid through the selected valve and into the selected bladder or other object to be inflated. Of course, when the pump is detached, the push-button actuators 45 are available for deflation.

Although various size parts may be used, in one practical embodiment, the diameter of the duckbill valve 51 was about 0.8 cm. and the overall size of the valve assembly was about 4.8 cm.×3.8 cm.×1.2 cm. thick.

While this invention has been particularly shown and described in reference to the preferred embodiments thereof, it will be understood by these skilled in the art that changes in form and detail may be made without departing from the scope of the invention. Thus, by way of example and not of limitation, other forms of check valves may be used; metal parts may be substituted for plastic, and alternative mechanical biasing and bore configuration arrangements may be used. Accordingly, the present invention is not limited to the specific arrangements shown in the drawings and described in the foregoing detailed description.

What is claimed is:

1. A combined check valve and fluid pressure relief valve assembly comprising:
   a valve body having a passage therethrough;
   said valve body being constructed of a molded piece of substantially rigid material;
   said valve body having a first cylindrical bore extending from an inlet port opening of the valve to a second cylindrical bore and the second cylindrical bore extending to an outlet port opening of the valve;
   said second bore having a cross-sectional area less than said first bore;
   said valve body having a substantially "J"-shaped groove extending from said inlet port opening;
   a duckbill valve, molded from a single piece of resilient material in a generally cylindrical hollow shape, having a pair of lips disposed in a converging relationship and adjacent to each other, side walls interconnecting the lips and defining an open end facing said inlet port, and an outwardly extending flange located around said open end;
   a cylindrical relief valve actuator loosely mounted within said valve body, said actuator having a substantially wide diameter outer end extending outwardly from said valve body for actuation by a user's finger;
   said valve actuator tapering downward to form a stem, with a reduced diameter at the end of said valve actuator in an axial direction, passing through a coil compression spring member and extending proximate to the lips of said duckbill valve, and including a guide and retention knob member on said actuator interfitting with different sections of said "J"-shaped groove for assembling and securing said valve actuator within said valve body;
   said compression coil spring member mounted between said actuator and said duckbill valve within said valve body and biasing said actuator away from said duckbill valve, with said retention knob member in said "J"-shaped groove guiding said actuator;
   said valve assembly including means for opening said duckbill valve by the end of said actuator when said actuator is depressed by a user's finger to permit fluid to escape past said actuator; and
   pressurizing means being removably mounted to said valve body and extending over the inlet port, said J-shaped groove and said knob, for applying fluid pressure to said inlet port around said actuator and opening the lips of said duckbill valve for fluid flow from said pressurizing means through said duckbill valve without actuating said valve.

2. A combined check valve and fluid pressure relief valve assembly as defined in claim 1 wherein an annular washer or gasket is mounted adjacent to the flanged portion of said duckbill valve providing additional support between said flange portion of said duckbill valve and said spring member.

3. A combined check valve and fluid pressure relief valve assembly as defined in claim 1 wherein said spring member has a diameter approximately equal to the diameter of the untapered portion of said actuator, and constitutes means for providing force sufficient to bias said knob member to securely rest against the closed end of the "J"-shaped groove, while also allowing the actuator to be easily depressed.

4. A combined check valve and fluid pressure relief valve assembly as defined in claim 1 wherein said valve body is constructed of a single molded piece of rigid plastic.

5. A combined check valve and fluid pressure relief valve assembly as defined in claim 1 wherein said flange of said duckbill valve has a diameter greater than the diameter of said second bore and no greater in diameter than the diameter of said first bore.

6. A combined check valve and fluid pressure relief assembly as defined in claim 5 wherein said knob member has a diameter less than the width of said "J"-shaped groove, and extends perpendicularly outward from said actuator a substantial distance so that it is substantially flush with the outer surface of said valve body.

7. A combined check valve and fluid pressure relief valve assembly as defined in claim 1 wherein said resilient annular sealing washer has a diameter substantially equal to the diameter of said flange portion of said duckbill valve.

8. A combined check valve and fluid pressure relief assembly as defined in claim 1 wherein said knob member is located a substantial distance from the top and is positioned on the outer surface of the untapered portion of said valve actuator.

9. A combined check valve and fluid pressure relief valve assembly as defined in claim 1 wherein said "J"-shaped groove and said retention knob member constitute means for permitting said actuator to be axially inserted into said valve body with said knob aligned with said "J"-shaped groove and locked into place with said knob member resting against two closed end of said "J"-shaped groove.

10. A combined check valve and fluid pressure relief valve assembly as defined in claim 1 wherein said duckbill valve has a length substantially less than the length of said second bore, allowing for the linear flow of a fluid to pass between said lips of said duckbill valve.

11. A combined check valve and fluid pressure relief valve assembly as defined in claim 1 further comprising a fluid inflating bulb having outlet means making a fluid-tight fit over said inlet port.

12. A combined check valve and fluid pressure relief valve assembly as defined in claim 1 further comprising conduit means coupled to said outlet port for inflation of associated equipment.

13. A combined check valve and push-button pressure relief valve assembly as defined in claim 1 wherein said duckbill valve is molded from a single piece of resilient material in a generally cylindrical hollow shape, and has a pair of lips disposed in a converging relationship and adjacent to each other, side walls interconnecting the lips and defining an open end facing said inlet post and outwardly extending flange located around said open end.

14. A combined check valve and push-button pressure relief valve assembly comprising:
a housing having an external surface and an internal bore extending through the housing, said housing having an inlet and an outlet;
a duckbill valve mounted in said bore;
push-button actuator means loosely mounted in said housing having a first position in which it extends outwardly away from said duckbill valve from said inlet side of said duckbill valve and a second position in which it opens said duckbill valve from the inlet side thereof, said actuator having a substantially wide diameter outer end extending outwardly from said valve body for actuation by a user's finger;
means for normally biasing said actuator means to said first position in which it does not open said duckbill valve;
said valve assembly including stop means for preventing movement of said actuator means by said biasing means beyond said first position;
pump means having an outlet means for making a tight fit over the external surface of the inlet to said housing and over said actuator, for applying air through said valve assembly by opening the lips of said duckbill valve assembly by the application of air pressure thereto without actuating said push button actuator means; and
said valve assembly including means for opening said duckbill valve by the end of said actuator when said actuator is depressed by a user's finger to permit fluid to escape past said actuator.

15. A combined check valve and push-button pressure relief valve assembly as defined in claim 14 wherein said valve body is constructed of a singled molded piece of rigid plastic.

16. A combined check valve and push-button pressure relief valve assembly as defined in claim 14 having a compression coil spring member mounted within said valve body.

17. A combined check valve and push-button pressure relief valve assembly as defined in claim 13 wherein said push-button actuator tapers downward to form a stem, with a reduced diameter at the end of said push-button actuator 9 in an axial direction, passing through said spring member and proximate to said duckbill valve.

18. A combined check valve and fluid pressure relief valve assembly comprising:
a valve body having a passage therethrough;
said valve body being constructed of a molded piece of substantially rigid material;
said valve body having a first cylindrical bore extending from an inlet port opening of the valve to a second cylindrical bore and the second cylindrical bore extending to an outlet port opening of the valve;
said second bore having a cross-sectional area less than said first bore;
a duckbill valve, molded from a single piece of resilient material in a generally cylindrical hollow-shape, having a pair of lips disposed in a converging relationship and adjacent to each other, side walls interconnecting the lips and defining an open end;
a cylindrical push-button relief valve actuator loosely mounted within said valve body and extending out said inlet port, said actuator having a substantially wide diameter outer end extending outwardly by a predetermined distance from said valve body for actuation by a user's finger;
said valve actuator tapering downward to form a stem, with a reduced diameter at the end of said valve actuator in an axial direction, proximate to the lips of said duckbill valve;
means for resiliently biasing said actuator away from said duckbill valve;
said valve assembly including stop means for preventing movement of said actuator by said biasing means beyond the point where said actuator extends outwardly from said valve body by said predetermined distance;
pressurizing means for applying a fluid through said cylindrical bores of the valve body, around said actuator, thereby opening said lips of said duckbill valve and allowing the passage of a fluid therethrough without actuating said push button actuator; and
said valve assembly including means for opening said duckbill valve by the end of said actuator when said actuator is depressed by a user's finger to permit fluid to escape past said actuator.

19. A combined check valve and fluid pressure relief valve assembly as defined in claim 18 wherein said push-button relief valve actuator is depressed causing said stem thereof to penetrate and open the lips of said duckbill valve, thus selectively permitting back flow of a fluid.

20. A combined check valve and fluid pressure relief valve assembly as defined in claim 18 wherein said knob member is located at substantial distance from the top and is positioned on the outer surface of the untapered portion of said valve actuator.

* * * * *